United States Patent [19]
Crandall et al.

[11] 3,792,733
[45] Feb. 19, 1974

[54] BEET HARVESTING MACHINE

[76] Inventors: Olon F. Crandall, P.O. Box 54, Hammett, Idaho 83627; Ralph Thompson, P.O. Drawer H, Glenns Ferry, Idaho 83623

[22] Filed: Feb. 15, 1973

[21] Appl. No.: 332,768

[52] U.S. Cl. .................................................. 171/58
[51] Int. Cl............................................. A01d 17/16
[58] Field of Search .......... 171/58, 128, 25, 92, 97; 56/105, 106; 130/30 R, 30 H

[56] References Cited
UNITED STATES PATENTS

| | | | |
|---|---|---|---|
| 2,944,611 | 7/1940 | Rollins.................................. | 171/58 |
| 3,654,997 | 4/1972 | Partyanko et al...................... | 171/58 |
| 3,695,366 | 10/1972 | Hook et al............................. | 171/58 |

FOREIGN PATENTS OR APPLICATIONS

| | | | |
|---|---|---|---|
| 577,338 | 5/1958 | Italy...................................... | 171/128 |

*Primary Examiner*—Antonio F. Guida
*Attorney, Agent, or Firm*—Wells, St. John & Roberts

[57] ABSTRACT

A harvester for root crops having a series of spaced apart pairs of digging wheels of known construction operable to lift the roots from several rows of growing crops and metal lifters to move the roots rearwardly from the wheels, has a plurality of transverse supporting rollers receiving the roots and provided with spiral ribs extending from the sides of the machine toward the center to concentrate the roots midway between the sides of the machine. A lower chain type conveyor receives the concentrated flow of roots. A flail over the rollers urges the roots on to the chain type conveyor. A large cylindrical elevator-sorter cage surrounds the rear portion of the conveyor. It sorts the flow of roots and soil, retaining the larger roots therein and dropping them on to an upper chain conveyor that extends forwardly above the lower conveyor from the rear wall of the cage out of the cage. An elevating and loading conveyor beneath the front end of the upper conveyor and in front of the cage, moves the roots laterally and upwardly. The machine has a tongue at the front end adjustably supporting the front end thereof on a tractor for movement up and down and laterally with respect to the tractor. Rear wheels support the cage and are movable laterally with respect to the machine for lateral alignment of the rear end of the machine.

10 Claims, 12 Drawing Figures

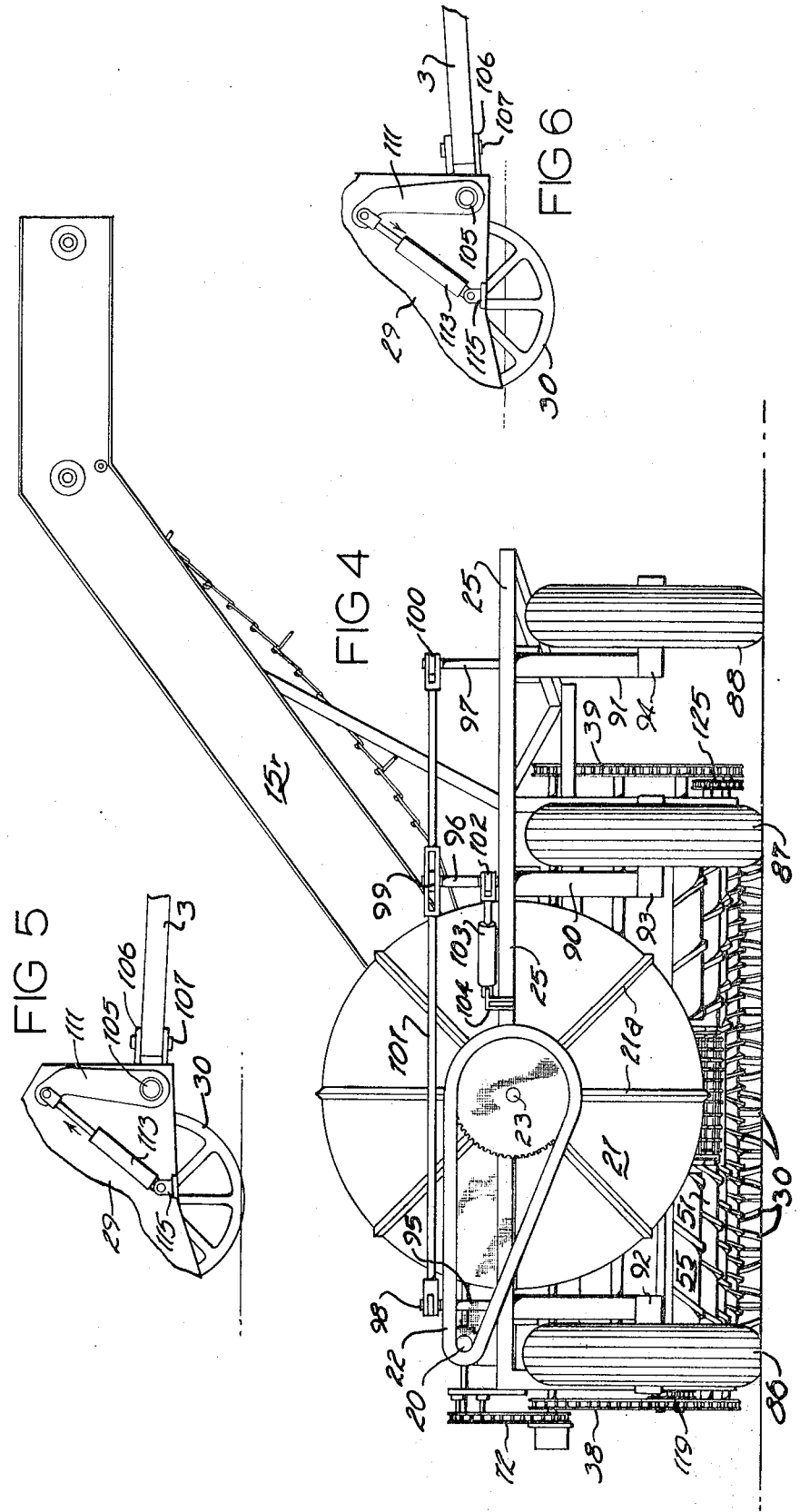

PATENTED FEB 19 1974 3,792,733
SHEET 4 OF 4
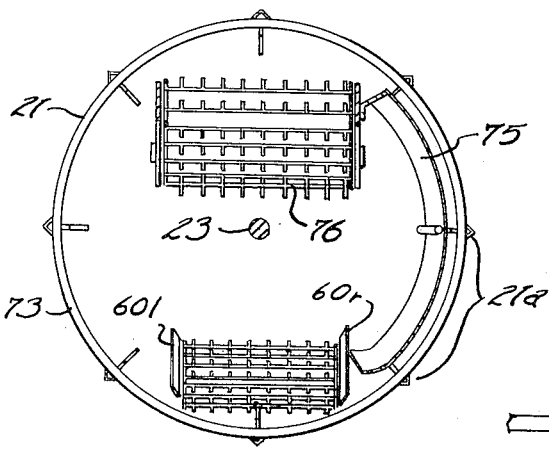
FIG 8
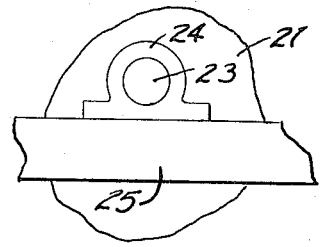
FIG 12
FIG 9
FIG 10
FIG 7
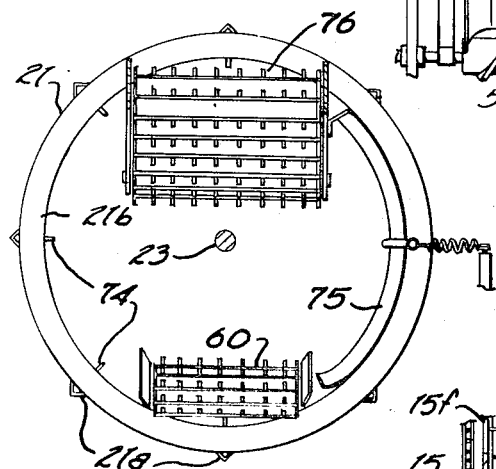
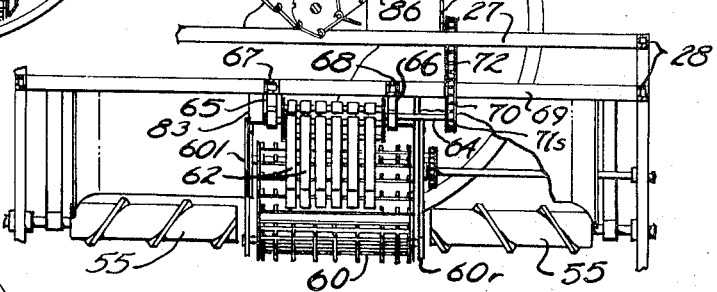

BEET HARVESTING MACHINE

BACKGROUND OF THE INVENTION

A variety of machines have been developed and put into use in this field. Such machines generally embody a series of pairs of digging wheels which lift the roots such as beets above the ground level and a paddle type or flail type lifter sweeps the lifted crop rearwardly on to a conveyor which carries the roots rearwardly and upwardly to load them. Typical examples of such machines are found in the old U.S. Pat. No. 2,688,222 to Sorenson, U.S. Pat. No. 2,637,964 to Orendorff, and U.S. Pat. No. 3,010,522 to Oppel. Despite the considerable improvements made in the machines, the need for sorting or grading the roots such as sugar beets harvested as to size and for removing the soil and trash has not been satisfied. It is still the practice to haul the crop to a central storage place or dump where cleaning and sorting takes place and the nonusable roots soil and trash are hauled away by the trucks that bring the crop to the dump. This results in the necessity to deduct the weight of such unusable roots, soil and trash from the total load weight in arriving at the compensation paid to the grower. The extra cost of hauling the unusable material to the storage place and back to the farm is an expense that needs to be eliminated.

OBJECTS OF THE INVENTION

It is an object of this invention to provide an improved harvester wherein the roots that are lifted from the several rows where they grew, are brought together into a central stream by a plurality of crop gathering rollers that extend transversely of the machine behind the digging wheels and are moved rearwardly onto a conveyor which moves them into an openwork sorting and elevating cage which rotates around the rear end of the conveyor and elevates the roots retained therein on to an upper conveyor within the cage which carries the roots retained in the cage forwardly out of the cage to a loading conveyor.

A further object of this invention is to provide, in a beet harvester having means to dig and bring together the beets from several rows into a moving stream, an openwork cage, open at one end receiving the stream of beets, said cage being closed at its other end and rotating upon a substantially horizontal axis and provided with means to elevate the beets received and retained therein and a conveyor in the cage receiving the elevated retained beets and extending to the open end thereof above the stream of beets entering the cage.

These and other objects and advantages of the invention will appear upon the reading of the following detailed description of a preferred embodiment of the invention as it is used in a harvester for sugar beets.

A BRIEF DESCRIPTION OF THE DRAWINGS

FIG. 4 is a rear end view of the machine.

FIGS. 5 and 6 are detail side views of the mechanism used for raising and lowering the front end of the machine.

FIG. 7 is a sectional view taken on the line 7—7 of FIG. 1.

FIG. 8 is a sectional view taken on the line 8—8 of FIG. 7.

FIG. 9 is a detail elevational view looking into the open end of the cage shown in section in FIG. 8.

FIG. 10 is a sectional view taken on the line 10—10 of FIG. 3.

FIG. 11 is a sectional view on line 11—11 of FIG. 1 illustrating the support bearings for the rear gathering rollers.

FIG. 12 is a fragmentary sectional view taken on the line 12—12 of FIG. 7 showing the end mounting of the elevator sorter cage.

DESCRIPTION OF A PREFERRED EMBODIMENT OF THE INVENTION

Figure 1:
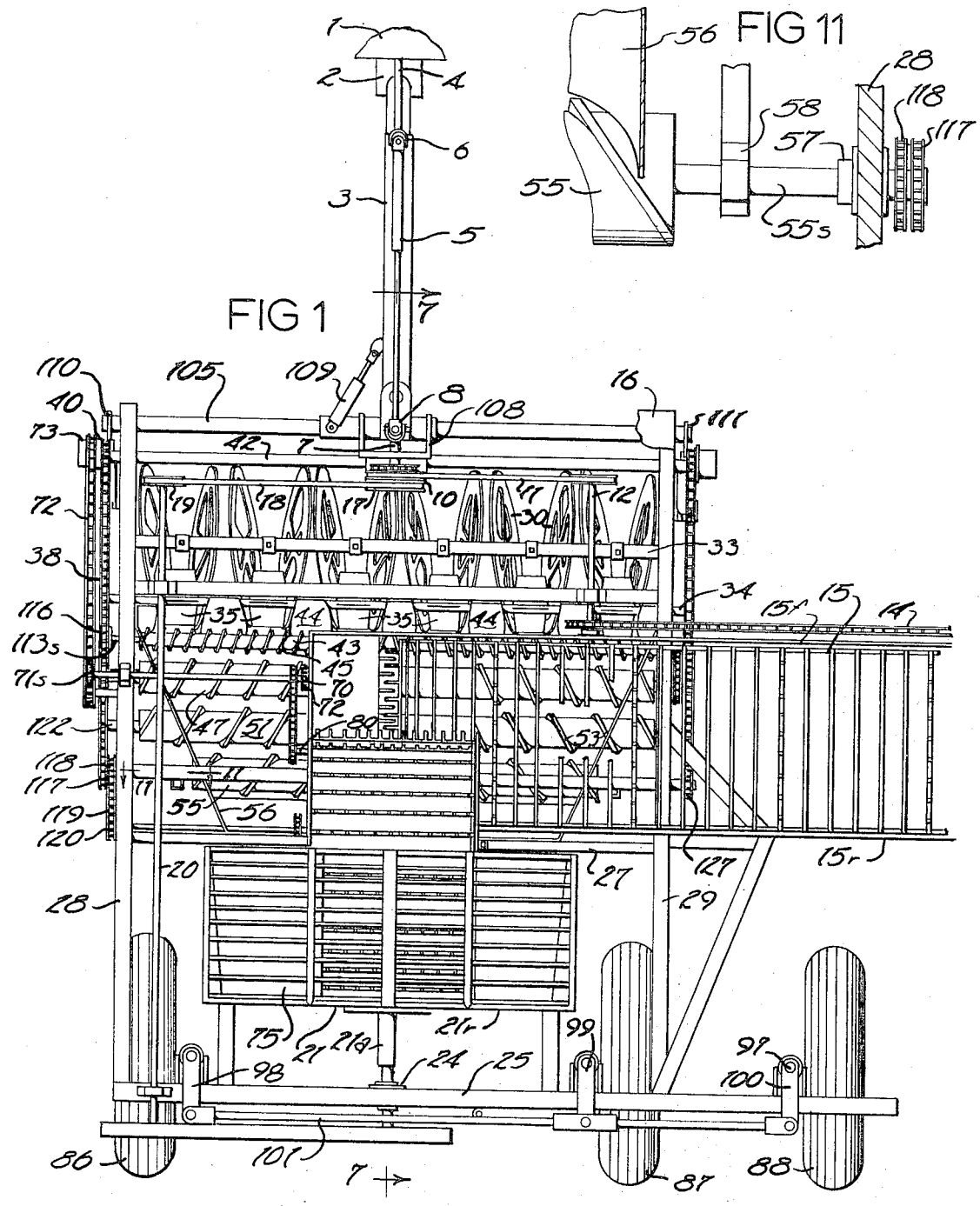
FIG. 1 is a plan view of a beet harvesting machine embodying the invention.

The invention is shown in a beet harvesting machine which is drawn by a tractor 1 of conventional design having a draw bar 2 which pivotally supports the front end of a tongue 3 of the machine. The tractor 1 has the usual power take-off shaft 4 for rotating an extensible shaft 5. The shaft 5 is connected to the shaft 4 by a universal joint 6 and at its rear end is connected to another shaft 7 by a universal joint 8.

The shaft 7 is supported on a front framework 9 of the machine and is drivingly connected by pulleys 10 and a V-belt 11 to a shaft 12 that drives a sprocket 13 and chain 14 to drive a loading conveyor 15. A platform 16 is mounted over the shaft 12 and extends rearwardly toward the conveyor 15. The shaft 7 has another pulley 17 thereon which drives a belt 18 for driving a pulley 19 on a shaft 20 that extends to the rear end of the machine for furnishing power to rotate a sorting and elevating cage 21. A belt and pulley drive 22 shown best in FIGS. 1, 4 and 7 connects the shaft 20 to a shaft 23 that carries the cage 21 and rotates the cage. The shaft 23 is mounted at the rear by a bearing 24 on a rear cross frame member 25 and extends through the rear wall 21r of the cage 21 and is fixed to this wall. The front end of the shaft 23 is mounted in a bearing 26 on a frame member 27 which extends in front of the cage 21 across the machine and is supported by side frame members 28 and 29.

The machine has six pairs of the well known digger wheels 30 so it can harvest six rows of beets at once. These pairs of wheels 30 are mounted on stub shafts 31 in substantially the manner shown in U.S. Pat. No. 3,010,522 (FIG. 7). The pairs of stub shafts 31 are carried by depending bars 32 which are carried by a cross frame member 33 extending from side to side of the machine. The wheels 30 are rotated by contact with the soil. A lifter shaft 34 of known construction carries a known metal lifter 35 for each pair of wheels 30 to lift and throw the beets dug by the pair of wheels rearwardly from between the wheels. The shaft 34 is driven from the shaft 7 through a pair of sprocket wheels 36 and 37 on the ends of the shaft 34, sprocket chains 38 and 39 and sprocket wheels and sprocket wheels 40 and 41 which are mounted on a cross shaft 42 which is geared to the shaft 7.

The beets, soil, and trash thrown back by the lifters 35 fall upon a front cleaning and gathering roller 43 slightly rearward of and below the lifters. For the purpose of preventing part of the crop from falling forward off the roller 43 between the pairs of wheels 30, baffles 44 are provided. This roller has a spiral rib 45 urging the crop falling thereon from the left hand end thereof toward the center as viewed in FIG. 1. It also has a spiral rib 46 urging the crop falling thereon from the right end thereof toward the center as viewed in FIG. 1. The crop is also moved rearwardly by the roller 43 on to another gathering roller 47 which has left and right hand ribs 48 and 49 thereon which urge the crop passing thereover toward the center of the roller 47. The ribs 48 and 49 are terminated short of the mid point of the roller 47 to leave a mid portion 50 of this roller cylindrical over which the crop moves rearwardly without being pushed toward the center. A third roller 51 is like the roller 47 and has ribs 52 and 53 similar to the ribs 48 and 49. However, the ribs 52 and 53 are directed considerably more lengthwise on the roller 51 than the ribs 48 and 49 are directed on the roller 47. The roller 51 has a non-ribbed mid portion 54 like the mid portion 50. The crop drops from the mid portion 54 on to a chain type conveyor 60 which has hangers 61 to engage the beets and urge them rearwardly. This conveyor 60 extends into the lower portion of the cage 21 through its open front end so as to deliver the crop into the lowermost part of the cage.

In order to move any part of the crop that is not moved on to the mid portions 50 and 54, two shorter rollers 55 that have spiral ribs thereon and baffle plates 56 are provided. These rollers 55 and baffle plates 56 extend close to and above the sides of the conveyor 60. Each roller 55 is supported at its outer end by spaced bearings 57 and 58 on each side frame of the machine.

The stream of crop on the mid portions 50 and 51 is further aided in its rearward travel by a plurality of flails 62 of rubber or the like. These flails are pivoted on a plurality of rods 63 that are carried by a shaft 64. The shaft 64 is carried on brackets 65 and 66 that depend from frame members 67 and 68. These frame members extend forwardly from a cross frame member 69, which is below the frame member 27, to the front frame 9. The shaft 64 is driven by a sprocket and chain drive 70 from a shaft 71 which extends to the left side of the machine as seen in FIG. 1 and has a sprocket wheel 71S driven by a chain 72 which is in turn driven by a sprocket wheel 72s on the power shaft 42.

The cage 21 receives the crop from the conveyor 60. The cage 21 comprises the rear wall 21r, a series of circular spaced apart parallel rings 73 which are secured together and to the rear wall 21r by a series of exterior angle irons 21a. The cage has a front band 21b. A multiplicity of vanes 74 extend from the band 21b to the rear wall 21r and are also secured to the rings 73. These vanes 74 extend radially inward from the rings 73 toward the shaft 23 and are equally spaced apart. They provide with the rings 73 a cylindrical grid in which the apertures defined by the rings and the vanes determine the sizes of beets that will be retained in the cage. The smaller beets, clods, etc. will fall through these spaces. The larger beets that cannot go between the rings 73 are carried upward by the vanes 74 until they are above a barrier 75 within the cage 21 and can fall off the vanes 74 on to an upper chain type conveyor 76 which extends forwardly to the open end of the cage 21 above the lower end of the elevating conveyor 15. The upper conveyor 76 is carried by a side frame 77, which also carries the barrier 75, and another side frame 78. These frames rotatably mount shafts 79 and 80 having sprockets 81 and 82 for the conveyor 76. The side frame 77 is supported from the frame members 68 and 69. The side frame 78 and the front and rear frames 15f and 15r of the conveyor 15 are supported from the frame members 68 and 29 from the shaft 71. The conveyor 76 is driven by a sprocket and chain drive 76s.

The lower conveyor 60 has its side frames 60l and 60r carried by uprights 83 and 84 which also support the inner ends of the baffle plates 56.

The lower portions of the conveyor frames 15f and 15r are joined by an upright wall 85 (FIGS. 3 and 10) which carries an inclined plate 86 extending downward toward the conveyor 15 from the wall 85 to direct the beets discharged from the upper conveyor 76 on to the conveyor 15. The front frame 15f acts as a stop to keep the beets from going too far forward. The combination of the gathering rollers 43, 47, 51 and 55, the flails 62, the lower conveyor 60, the sorting and elevating cage 21, and the upper conveyor 76 provide a novel and effective means to concentrate the crop lifted by the known digging wheels 30 and the known lifters 35, to clean and sort out the beets of the size desired and deliver them on to the known loading conveyor 15. The arrangement of the conveyors 60 and 76 and the cage 21 keeps the harvester short in fore and aft length.

The rear end of the machine is carried by three wheels 86, 87 and 88, which are mounted to the rear frame 25 by pedestals 89, 90 and 91 that are fixed to the frame 25 and rest upon hubs 92, 93 and 94. The hubs have stems 95, 96 and 97 going up through the pedestals. The stems have fixed thereon lever arms 98, 99 and 100 extending rearwardly therefrom. These arms are connected together at their free ends by a bar 101. To turn the wheels the mid stem 96 has an arm 102 fixed thereon. A hydraulic jack 103 connects the end of the arm 102 to a bracket 104 on the rear frame 25. By lengthening or shortening the jack 103, the wheels can be turned to left or right.

The tongue 3 of the machine is so connected thereto as to provide lifting and lowering of the front end of the machine and to provide for lateral movement of the front end of the machine with respect to the tractor so as to keep the machine aligned with the beet rows. A front cross beam 105 has a clevis fixed 106 thereon to which the tongue is secured by a pivot pin 107. (See FIG. 7) A bracket 108 pivotally mounts the mid portion of the cross beam 105 to the front frame 9. The tongue is adjusted to right or left with respect to cross beam 105 by a hydraulic jack 109.

In order to lift or lower the front end of the machine, the cross beam 105 has upwardly extending arms 110 and 111 fixed to its ends outside of the side frames 28 and 29. The cross beam 105 is pivoted in the side frames 28 and 29. Two hydraulic jacks 112 and 113 extend rearwardly and downwardly from the upper ends of the arms 110 and 111 have their lower ends pivoted in brackets 114 and 115 that are fixed to the side frames 28 and 29. By lengthening the jacks 112 and 113, the front end of the machine (FIG. 5) is raised. To lower the frong end of the machine and bring the diggers 30 into the ground, the jacks 112 and 113 are shortened (FIG. 6).

Figure 2:
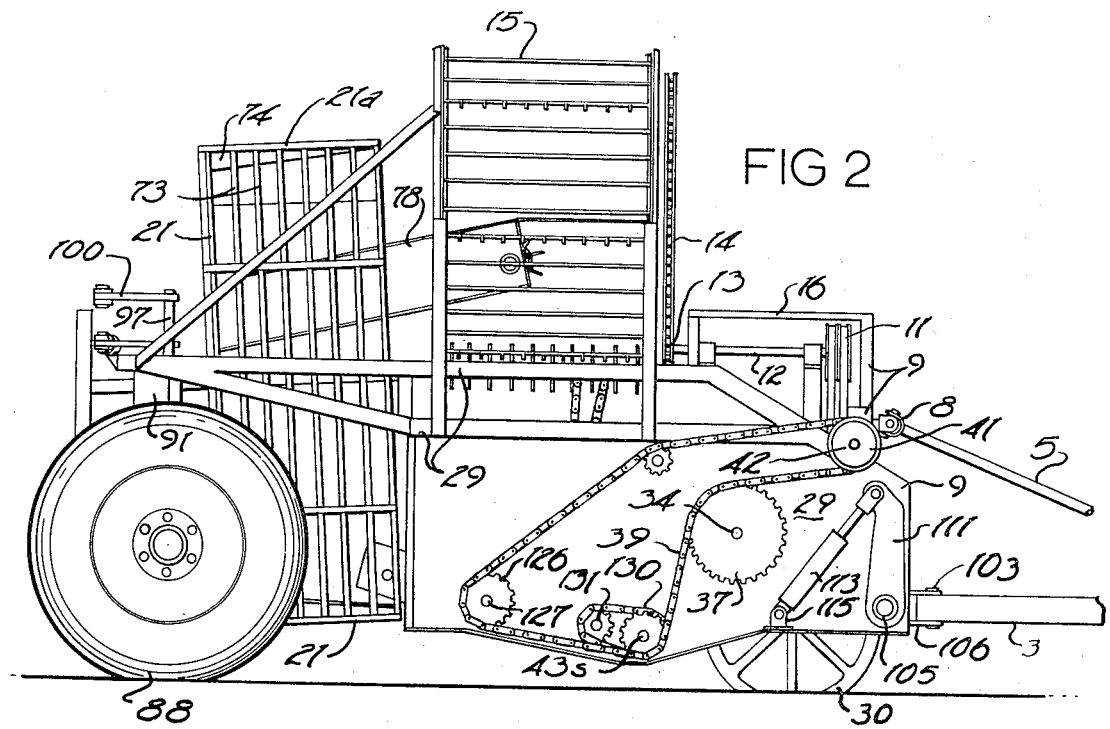
FIG. 2 is a side view of the machine looking at FIG. 1 from the right.
Figure 3:
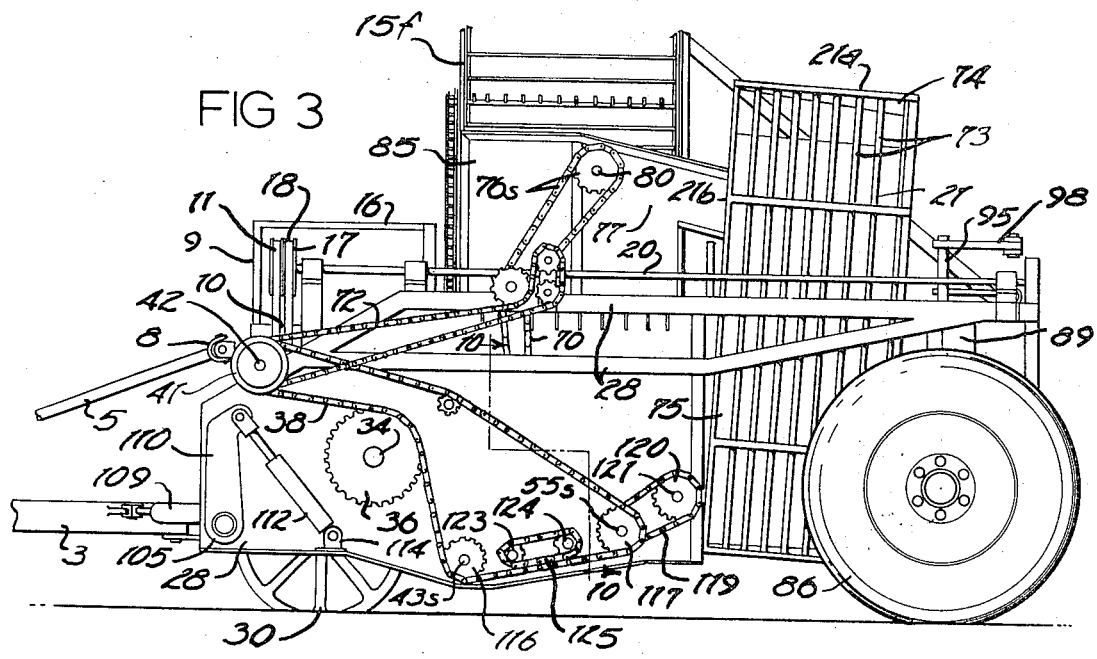
FIG. 3 is a side view of the machine looking at FIG. 1 from the left.

FIGS. 2 and 3 illustrate the several driving chains for the several rollers 43, 47, 51 and 55, for the lifter shaft 34, for the flail shaft 64 and for the conveyors 60 and 76. The chain 38 drives a sprocket 116 on the shaft 43s of the roller 43 to rotate the roller 43 in the direction indicated on the sprocket 116, FIG. 3. The chain 38 also extends to and drives a sprocket 117 on a shaft 55s of the left hand roller 55 as seen in FIG. 1. The shaft 55s extends out beyond the sprocket 117 and has fixed thereon another sprocket 118 that drives a chain 119. The chain 119 drives a sprocket 120 on a shaft 121 that has a bearing in the side frame 28 and extends transversely to the side frame of the lower conveyor 60 where it is carried. The shaft 121 drives the conveyor 60.

The rollers 47 and 51 are connected by sprockets 123 and 124 and a chain 125. They receive their driving power from the right hand side of the machine through the front roller 47 as seen in FIGS. 1 and 2. The chain 39 drives a sprocket wheel 126 on the shaft 127 of the right side roller 55. It also drives the shaft 43s of the front roller 43 so that this roller is powered from both ends. The shaft 43s has a second sprocket wheel 129 fixed thereon which drives a short chain 130 that drives a sprocket wheel 131 on the shaft 123 of the roller 47. Thus the power for the rollers 47, 51 and righthand short roller 55 is derived from the chain 39.

The operation of the machine is believed to be clear from the foregoing description.

Having described our invention we claim:

1. In a harvester of roots crops such as beets having means to uproot and bring together the crop from several rows into a moving stream;
   an openwork cage in the stream path, rotatable on generally horizontal axis and open at only one end to receive the crop;
   means in said cage operable by rotation thereof to elevate the crop while discarding smaller roots and soil through the cage wall;
   a lower chain conveyor urging the crop into the cage through said open end; and
   an upper conveyor in the cage operable to receive the elevated retained roots;
   said upper conveyor extending the length of the cage.

2. The harvester defined in claim 1 in which transverse gathering rollers arranged transversely in front of the open end of said cage converge the crop in front of said lower conveyor.

3. The harvester defined in claim 1 wherein said cage comprises:
   a plurality of circular rings that are spaced apart equal distances from the adjacent rings;
   equally spaced vanes within the rings holding said in their spaced relation; and
   an end closure carrying said vanes.

4. The harvester defined in claim 3 wherein the upper conveyor has a depending baffle cooperating with said vanes to hold the retained roots on the vanes until they are above the level of the conveyor.

5. The harvester defined in claim 1 wherein said lower conveyor has fingers operable to loosen and separate soil from the crop.

6. In a harvester of beets and like root crops wherein diggers are arranged to lift the roots in a plurality of parallel rows out of the ground as the harvester moves in the direction of the rows;
   a plurality of crop gathering rollers carried by said harvester behind the diggers having ribs to move the lifted roots transversely of the rows and concentrate them into a single stream;
   a chain type lower conveyor carried by the harvester and extending behind the rollers in position to receive the roots therefrom;
   an open ended annular cage surrounding the discharge end of said conveyor and receiving the roots therefrom;
   said cage having vanes therein operable to elevate the roots therein above the conveyor;
   means to rotate said cage;
   said cage having apertures therein for passing small roots, soil and trash outward through it; and
   means in the cage above the conveyor to remove the elevated roots therefrom.

7. The invention defined in claim 6 wherein the annular cage comprises a plurality of equally spaced rings secured to said vanes and a rear wall to which said vanes are secured.

8. The invention defined in claim 6 together with flails over the rollers; and
   means to rotate the flails in a direction to move the roots on to the conveyor.

9. The invention defined in claim 6 wherein said last named means comprises an upper conveyor in the upper half portion of the cage moving endwise thereof; and
   a barrier within the cage secured to the upper conveyor for holding the roots on the vanes until they are elevated above the upper conveyor.

10. The invention defined in claim 6 wherein the rollers include two rear short rollers terminating at the sides of said lower conveyor.

* * * * *